Jan. 17, 1939.                    W. K. YOUNGBERG                    2,144,557
                                    FOOD SLICER
                                 Filed Dec. 16, 1935
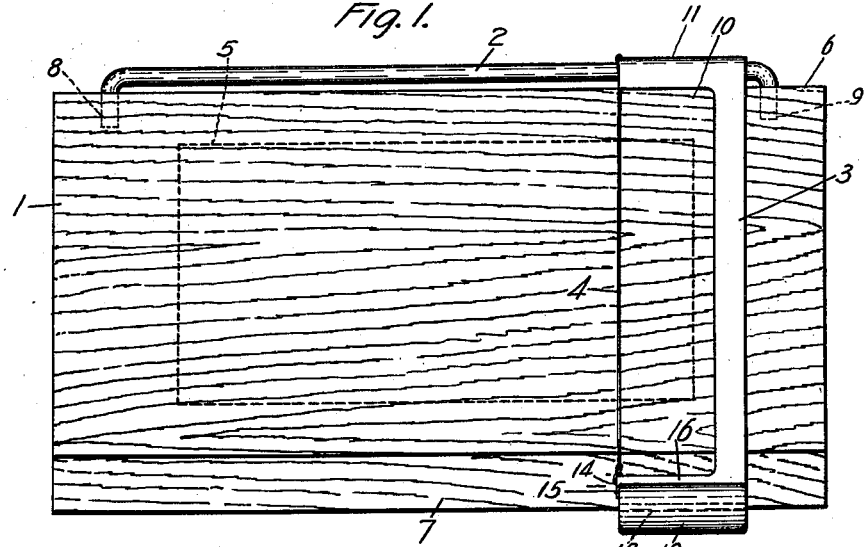
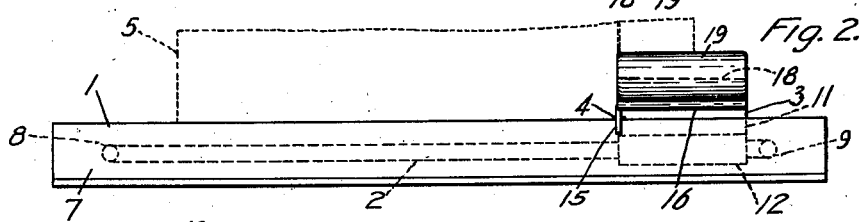
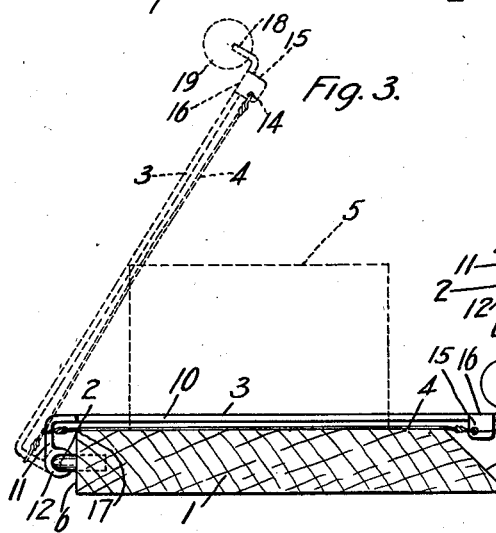
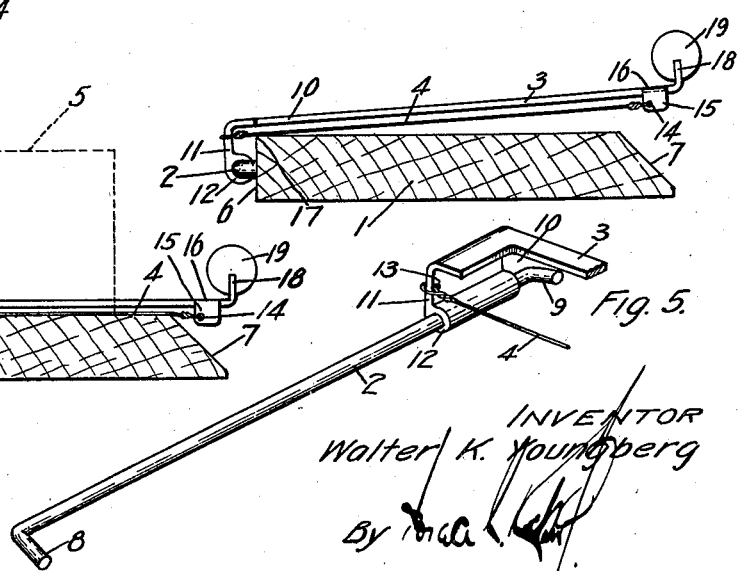
INVENTOR
Walter K. Youngberg
By
ATTORNEY Patented Jan. 17, 1939

2,144,557

UNITED STATES PATENT OFFICE 2,144,557

FOOD SLICER

Walter K. Youngberg, Meriden, Conn.

Application December 16, 1935, Serial No. 54,709

21 Claims. (Cl. 31—28)

My invention relates to food slicers.

It has among its objects to provide an improved food slicer and, more particularly, such a device especially adapted to use in connection with slicing cheese, butter or the like. A further object of my invention is to provide such an improved device having slicing means of an improved construction and disposed and mounted in an improved manner. A still further object of my invention is to provide such an improved device especially adapted to home use and to be very inexpensively produced, while being of a markedly compact construction minimizing injury to the device and facilitating storage thereof when not in use. These and other objects and advantages of my improved construction will, however, hereinafter more fully appear.

In the accompanying drawing, I have shown for purposes of illustration one embodiment which my invention may assume in practice.

In this drawing,—

Fig. 1 is a plan view of the device;

Fig. 2 is a side elevation of the same, the view being taken from the bottom of Fig. 1;

Fig. 3 is an end view of the same with the slicing means shown in dotted and full lines in the positions occupied at the beginning and end of a normal slicing operation;

Fig. 4 is an end view similar to Fig. 3, showing the slicing means in normal position, and Fig. 5 is a detail view of a portion of the slicing means and the supporting member therefor.

In this illustrative construction, I have shown my invention as including a base or board 1 adapted to carry the food to be sliced, and in turn carrying a longitudinally extending slicer support 2, and having a slicer member 3 suitably longitudinally and pivotally movable thereon and carrying a slicing wire 4 adapted in different longitudinal positions of the member 3 on the support 2 to slice the food, generally indicated in dotted lines at 5, which is carried on the upper surface of the board 1, the several elements being of an improved construction as hereinafter more fully described.

Referring more particularly to the board 1, it will be noted that the same is herein formed of wood provided with a flat unstained upper surface adapted to carry the food 5, as, for example, a piece of cheese or butter to be sliced. Further, it will be noted that herein the board 1 is provided with a vertical side wall or edge 6 disposed along the entire length of one side of the board, while the opposite edge of the board is preferably cut away or beveled, as shown at 7, to facilitate movement of the slicing means as hereinafter described. Upon the edge 6 of the board 1, the slicer support 2 is fixed. Herein, this support is in the form of a length of rod or wire or the like of suitable cross section and extending longitudinally substantially throughout the length of the board 1, while being spaced slightly laterally from the surface 6 of the board and also being disposed substantially midway between the top and bottom of the board. As shown, the support 2 is also suitably attached to the board 1 by providing lateral extensions 8 and 9 on the opposite ends of the support and suitably extending these into the board, as, for example, by driving the same into suitable parallel apertures disposed in the same plane in the board and in which these ends are received with a driving fit. Attention is further directed to the fact that herein, before insertion in the board, these portions 8 and 9 are disposed angularly relative to one another and the body of the member 2, with one portion slightly bent up relative to the body, while the other is slightly bent down. In insertion, the rod is so twisted as to cause both portions to be disposed in the same plane when in the board. Thus, I am able to produce a simple and inexpensive bearing support for the slicer member 3, which extends along substantially the whole upper surface of the board 1 and is very rigid due to the torsioning of the same by the engagement of the portions 8, 9 with the walls of the holes in the board.

Referring more particularly to the slicing means, it will be noted that the same includes a pivoted slicing member 3, herein in the form of a sheet metal stamping journaled on the support 2 and carrying the slicing wire 4. As shown, the member 3 is provided with a flat portion between its ends which is adapted to overlie the upper surface of the board 1 while connecting the opposite end portions of the member 3 to which the wire 4 is connected and cooperating with said end portions and the wire 4 to provide a food aperture 10 of substantial width for the sliced food. Herein, the member 3 is also provided at its pivoted end with a down-turned portion 11, which, in turn, is provided with a rolled-over portion 12 on its lower inner edge, providing a long journal bearing rotatable on the body of the member 2 while also being longitudinally slidable at will in either direction on the latter. Here, also, it will be noted that a suitable aperture 13 is provided in the downturned portion 11 near the top and inner edge thereof, and that the slicing wire 4 has one end suitably attached in this aperture and the other end suitably attached in a corresponding aperture 14 on the front edge of a depending transversely disposed wing member or lug 15 formed on the opposite or free end of the member 3. Further, it will be particularly noted that the wire 4 is so supported that, when the member 3 is not in use, the wire engages the corner or corner edge 17 at the top of the surface 6 on the base 1, in such manner as normally to hold the member 3 in the slightly raised position shown in Fig. 4, while being depressible during slicing into the position shown in full lines in Fig. 3 wherein both connections of the wire to the member 3 are below the plane of the food supporting surface of the base. As a result, it will be observed that the wire 4 is additionally tensioned by its contact with the edge 17 as the member 3 moves downward, in such manner as to enable the wire 4 to come into contact with the top surface of the board substantially uniformly throughout the effective length of the wire 4. Here, it will also be noted that the extension 15 is disposed beyond the top surface of the board and over the cut away or beveled side 7 thereof, in such manner as not to contact with the board. Further, even if the device is abused, as, for example, if, following normal tensioning of the wire 4 by the board, the slicing means is pressed into its full down position, it will be observed that due to the resiliency of the wire and of the sheet metal member 3, the member 3 will engage with the top of the board in such manner as to prevent destructive tensioning of the wire by the operator. It will also be observed that the portion 16 on the member 3 is adapted to provide a handle, as, for example, by bending up a flange 18 on its edge, although it will be noted that herein a cylindrical slotted length of suitable composition 19 and herein forming the handle portion proper, is also provided and fixed on this portion 18.

As a result of my improved construction, it will be apparent that when the food 5 to be sliced, as, for example, a piece of cheese or butter, is disposed on the upper surface of the board 1, the slicing means may be suitably slid along the support 2 to bring the wire 4 into position to slice off a slice of any desired width. Thereafter, as the slicing means is moved from the dotted line position, shown in Fig. 3, to the full line position illustrated therein, the selected slice will be cut. During this slicing movement, it will also be evident that with the wire 4 tensioned as it moves downward by engagement with the corner 17 of the base at a point adjacent the slicer member pivot and thereafter progressively contacting throughout its length on the upper surface of the board 1, the slice cut will be cut off, or severed, cleanly substantially to the bottom thereof in such manner as to permit the slices to be attractive and readily removable as they are cut. Further, due to the construction including the food aperture 10, it will be evident that the size of the slice may be varied within wide limits. Here, of course, it will also be evident that if desired the necessary adjustment between successive slices may be made by either sliding the slicer 3 along the support 2 or moving the food sliced along the board 1 as the user prefers.

Attention is further directed to the fact that in my improved construction, by reason of the engagement of the wire 4 with the corner 17 of the board 1 and the improved connection of the wire to the member 3, it is made possible not only to tension the wire during cutting as previously described and cleanly cut off a slice, but also to eliminate any necessity for exact location of the wire relative to its supports in order to permit the wire at the end of each slicing operation to come in contact throughout its cutting portion with the upper surface of the board 1. My improved structure, eliminating all necessity for slots in the food support and requiring only a single smooth plane surface, is also adapted to be markedly more readily, thoroughly and quickly cleansed than prior structures requiring slots into which the cutting element must move. Moreover, it will be observed that this construction is such that both the wire 4 and the slicer portion 3 are disposed very compactly vertically relative to the board 1 in the normal position of the parts, in such manner as to permit the device to be packed or stored in a minimum of space without requiring the use of any slots or partitioning of the base which produce an unsanitary construction difficult to clean. Also, the engagement of the wire 4 with the base 1, above described, permits the slicing means 3 to be pressed down into its full down position whenever desired, as, for example, during packing, or during storing, as when in a pantry, it is desired to place something else on top of the device. Attention is further directed to the fact that the structure requires only a small number of inexpensive parts which are readily assembled all in such manner as to enable the device to be very inexpensively manufactured and sold. These and other advantages of my improved construction will, however, be clearly apparent to those skilled in the art.

While I have in this application specifically described one form which my invention may assume in practice, it will be understood that this form of the same is shown for purposes of illustration and that the same may be modified and embodied in other forms without departing from its spirit or the scope of the appended claims.

What I claim as new and desire to secure by Letters Patent is:—

1. In a food slicer, a base having a food supporting surface, and a pivoted slicer carrying member thereon having a portion overlying the food supporting surface of the base and disposable adjacent to the food supporting surface of said base at the completion of slicing and also having a slicing element laterally offset from said portion to provide a sliced food aperture between said portion and element and adapted to engage and cooperate with said food supporting surface of said base to tension said slicing element and to cause said element to cut substantially entirely through the food.

2. In a food slicer, a base having a food supporting surface, and a slicer carrying member pivoted on and slidably associated with said base and having at the end of a slicing operation a portion overlying and disposed transversely of said surface close to the latter and also having a slicer cooperating during slicing with said portion to form a sliced food aperture and normally disposed in a plane adjacent the bottom of said portion and adapted to engage the food supporting surface of the base substantially throughout the length of each slice.

3. In a food slicer, a base having a food supporting surface, and a member pivoted on said base comprising slicer and slicer carrying members, the former member being adapted to engage and be tensioned by the food supporting surface of said base and the latter member being subsequently engageable with said surface to limit tensioning of said slicer, and said slicer and slicer carrying members being disposable in close adjacency to the surface of the base and having a sliced food receiving aperture between the same.

4. In a food slicer, a base having an upper food supporting surface, slicing means pivoted on said base comprising a slicing wire adapted to engage the food supporting surface of said base substantially throughout the length of each slice and a wire carrying member movable longitudinally of said base to present said slicing wire in any of a plurality of longitudinally spaced slicing positions, said wire and carrying member having laterally spaced portions providing a sliced food aperture therebetween whereby surfaces of the food contacted by the wire will not be engaged by said member during the slicing operation, irrespective of the depth of the cut.

5. In a food slicer, a supporting base having a food supporting surface, and pivoted slicing means thereon including a slicing wire adapted to engage the food supporting surface of said base, and wire supporting means including a pair of spaced wire supports normally maintained out of contact with said base at the end of a slicing operation and to which the ends of said wire are permanently fixed adjacent opposite sides of said supporting surface for necessarily effecting tensioning of said wire solely by contact of said wire with said base during operation as said slicing means approaches the end of its movement during slicing, said wire engaging said wire supporting means only at said pair of wire supports.

6. In a food slicer, a base having a food supporting surface, and pivoted slicing means movable longitudinally along said base including a slicing wire support and a slicing wire supported thereby and engageable with the food supporting surface of said base at various points along the latter, said wire and support providing a sliced food aperture therebetween and said food supporting surface engaging and tensioning said wire as said slicing means nears the end of its movement to effect slicing.

7. In a food slicer, a food supporting base, and food slicer means pivoted thereon and movable longitudinally thereof including a slicing wire and means for supporting the latter for tensioned engagement with said base at various points along the latter, said engagement at each point first occurring adjacent the pivot of said slicer means and the food being progressively sheared across the base as the wire nears the end of its movement to effect slicing.

8. In a food slicer, a base having an upper food supporting surface, and pivoted slicing means on said base movable longitudinally thereof including a slicing wire engageable with the food supporting surface of said base and having spaced wire supporting means to which the extremities of said wire are permanently fixed and by which these extremities are moved below said surface at opposite edges of said base to bring said wire into tensioned engagement with said surface substantially throughout the length of the slice, and a supporting member carrying said spaced supporting means and providing a sliced food aperture between said member and said wire.

9. In a food slicer, a base having a food supporting surface, and slicing means thereon including a slicing wire and having spaced wire supporting means and also having carrying means for said supporting means disposed transversely of said base and longitudinally spaced along said base from said wire whereby surfaces of said food contacted by said wire will not be engaged by said carrying means during the slicing operation irrespective of the depth of the cut, said slicing wire being disposable in engagement with said surface at the completion of each slicing operation.

10. In a food slicer, a food supporting base, and pivoted slicing means thereon including a slicing wire, said wire normally engaging said base initially at a point adjacent the pivot of said slicing means and arranged thereafter progressively to approach the food supporting surface of the base and engageable substantially throughout its slicing portion with said base as said slicing means approaches the end of its movement about its pivot.

11. In a food slicer, a base having a food support and a side wall, a laterally projecting rod seated in said wall, and pivoted slicing means longitudinally slidable on said rod.

12. In a food slicer, a base having a food support and a side wall, a laterally projecting rod having laterally extending end portions seated in said wall and holding said rod in torsion, and pivoted slicing means longitudinally slidable on said rod.

13. In a food slicer, a base having a food support and a side wall, a laterally projecting and longitudinally extending rod carried on said wall, and pivoted slicing means on said rod and having a depending bearing portion journaled on said rod, and transverse slicer and slicer carrying means disposed transversely in spaced relation along said base above said bearing portion close to said food support.

14. In a food slicer, a base having a food support and a side wall, a laterally projecting and longitudinally extending rod carried on said wall, and pivoted slicing means including a transverse wire supporting frame journaled on said rod for movement longitudinally thereof into a plurality of slicing positions and a slicing wire carried on said frame and spaced horizontally from said frame to present a sliced food aperture at one side of the latter whereby surfaces of the food contacted by the slicing element will not be engaged by said support during the slicing operation irrespective of the depth of the cut.

15. In a food slicer, a base having a food support, a rod carried on said base at one side of said support, and pivoted slicing means including a slicing wire and a supporting frame carrying said wire and journaled on said rod and including a laterally disposed frame portion providing a sliced food aperture and extending alongside said wire and movable into adjacency to said base during slicing, said slicing means being substantially horizontally disposable and longitudinally slidable on said rod.

16. A food slicer member comprising a slicing wire supporting frame having journal bearing means adapted for sliding movement and having a wire and a wire supporting portion relatively laterally spaced along said journal means for forming a sliced food aperture therebetween and extending transversely of said journal means, said wire supporting portion having depending end portions carrying said wire and bringing said wire into engagement with a food supporting base in advance of said wire supporting portion.

17. In a food slicer, a base having an upper food supporting surface, a member extending in spaced relation to and secured to said base, a pivoted slicer carrying support on said member slidably engaging the same, said support having a portion thereof extending across said supporting surface and adapted to be moved into substantially contacting relation with said supporting surface, said support having a slicing element secured thereto and laterally spaced from said portion and adapted to cut substantially completely through the food on said surface whereby surfaces of food contacted by the slicing element will not be engaged by said support during the slicing operation, irrespective of the depth of the cut.

18. In a food slicer, a base having a flat upper food supporting surface, slicing means disposable substantially in contact with said base including a slicer carrying member and a slicing element providing a sliced food aperture therebetween and having said slicing element engageable and cooperating with the food supporting surface of said base to tension said element, and means for enabling movement of said slicing means longitudinally of said base into different slicing positions.

19. In a food slicer, a base having an upper food supporting surface, slicing means disposable substantially in contact with said base including a slicer carrying member normally maintained out of contact with the base during slicing and out of contact with the sliced surfaces of the food, irrespective of the depth of the slice, and a slicing element cooperating therewith to provide a sliced food aperture and supported by said carrying member and engageable and cooperating with said food supporting surface, and means for enabling movement of said member longitudinally of said base into different slicing positions, said surface being free from slots and adapted to cooperate with said slicing element in all positions of the latter, said carrying member being adapted to contact the food supporting surface at various points in the longitudinal extent thereof.

20. In a food slicer, a base having a food supporting surface, and slicing means pivoted on the base including wire supporting means maintained out of contact with the base during slicing and out of contact with the sliced surfaces of the food, irrespective of the depth of the slice, and a slicing wire supported by said supporting means and engageable with the food supporting surface of said base for necessarily tensioning said wire as it moves into said engagement with said base.

21. In a food slicer, a base having a food supporting surface, and food slicer means thereon pivoted on the base including a slicing wire support normally maintained out of contact with the base at the end of a slicing operation and out of contact with the sliced surfaces of the food, irrespective of the depth of the slice, and a slicing wire carried by said support normally engaging and cooperating with the base and adapted to resiliently support said means in acute angular relation to and above said base.

WALTER K. YOUNGBERG.